(12) United States Patent
Ernesti et al.

(10) Patent No.: US 7,669,763 B2
(45) Date of Patent: Mar. 2, 2010

(54) METHODS AND SYSTEM FOR MANAGING STOCK

(75) Inventors: Bernd Ernesti, Wlestoch (DE); Stefan Grabowski, Oathofen (DE); Daniela Schalper, Muhlhausen (DE)

(73) Assignee: SAP AG, Walldorf (DE)

( * ) Notice: Subject to any disclaimer, the term of this patent is extended or adjusted under 35 U.S.C. 154(b) by 556 days.

(21) Appl. No.: 10/873,272

(22) Filed: Jun. 23, 2004

(65) Prior Publication Data
US 2005/0284934 A1    Dec. 29, 2005

(51) Int. Cl.
| | |
|---|---|
| G06F 19/00 | (2006.01) |
| G06Q 30/00 | (2006.01) |
| G06Q 90/00 | (2006.01) |
| G06K 15/00 | (2006.01) |
| G07B 15/02 | (2006.01) |
| G06G 1/14 | (2006.01) |
| G06Q 20/00 | (2006.01) |
| G06Q 10/00 | (2006.01) |
| G05B 19/00 | (2006.01) |
| G05B 23/00 | (2006.01) |
| G06F 7/00 | (2006.01) |
| G06F 7/04 | (2006.01) |

(52) U.S. Cl. ................. 235/385; 235/383; 235/384; 235/435; 235/487; 705/22; 705/28; 340/5.92

(58) Field of Classification Search ......... 235/383–395, 235/435, 487; 705/22, 28; 340/5.92
See application file for complete search history.

(56) References Cited

U.S. PATENT DOCUMENTS

| | | | | |
|---|---|---|---|---|
| 3,866,767 A | * | 2/1975 | Zollinger et al. | 414/279 |
| 3,880,299 A | * | 4/1975 | Zollinger et al. | 414/273 |
| 3,958,102 A | * | 5/1976 | Burt | 235/385 |
| 5,201,397 A | * | 4/1993 | Isaacs | 198/395 |
| 5,504,319 A | * | 4/1996 | Li et al. | 235/462.08 |
| 5,725,253 A | * | 3/1998 | Salive et al. | 283/67 |
| 5,780,826 A | * | 7/1998 | Hareyama et al. | 235/385 |
| 5,804,810 A | * | 9/1998 | Woolley et al. | 235/492 |
| 5,886,634 A | * | 3/1999 | Muhme | 340/572.1 |
| 5,890,562 A | * | 4/1999 | Bartels et al. | 187/224 |
| 5,959,568 A | * | 9/1999 | Woolley | 342/42 |
| 6,202,925 B1 | * | 3/2001 | Machii et al. | 235/380 |
| 6,496,806 B1 | * | 12/2002 | Horwitz et al. | 705/28 |

(Continued)

OTHER PUBLICATIONS

U.S. Appl. No. 10/873,221, filed Jun. 23, 2004, entitled "Methods and Systems for Managing Stock Transportation."

Primary Examiner—Daniel Walsh
(74) Attorney, Agent, or Firm—Finnegan, Henderson, Farabow, Garrett & Dunner, LLP

(57) ABSTRACT

Systems and methods are disclosed for providing stock visibility in a storage facility, such as a warehouse. Such systems and methods may provide information identifying the location of stock while it is being transported to a new location, as well as may provide the ability to alter the destination of stock while it is in transit to a new location. Upon the removal of stock from a bin, a warehouse management system may be updated to indicate a resource that is being used to move the stock and, thus, provide visibility of the stock while it is in transit. In addition, through identification of the resource moving the stock to a new location, the resource can be rerouted to transfer the stock to an alternate location.

31 Claims, 11 Drawing Sheets

U.S. PATENT DOCUMENTS

| | | |
|---|---|---|
| 6,600,418 B2 * | 7/2003 | Francis et al. ............ 340/572.1 |
| 6,662,068 B1 | 12/2003 | Ghaffari |
| 6,669,089 B2 * | 12/2003 | Cybulski et al. ............ 235/385 |
| 6,768,931 B2 * | 7/2004 | Takehara et al. ............ 700/225 |
| 6,801,245 B2 * | 10/2004 | Shniberg et al. ............ 348/169 |
| 6,996,673 B2 * | 2/2006 | Goodman et al. ............ 711/114 |
| 7,018,129 B1 * | 3/2006 | Smith ............................ 404/6 |
| 7,034,683 B2 * | 4/2006 | Ghazarian ................ 340/568.1 |
| 7,036,729 B2 * | 5/2006 | Chung ........................ 235/385 |
| 7,038,573 B2 * | 5/2006 | Bann ........................ 340/10.1 |
| 7,121,457 B2 * | 10/2006 | Michal, III .................. 235/375 |
| 7,148,800 B2 * | 12/2006 | Cunningham et al. .. 340/539.11 |
| 7,180,423 B2 * | 2/2007 | Forster et al. ............ 340/572.7 |
| 7,236,851 B2 * | 6/2007 | Charych ..................... 700/214 |
| 7,267,270 B2 | 9/2007 | Hopwood et al. |
| 7,273,172 B2 | 9/2007 | Olsen et al. |
| 7,295,114 B1 * | 11/2007 | Drzaic et al. ............. 340/572.1 |
| 7,319,393 B2 * | 1/2008 | Forster .................... 340/572.1 |
| 7,336,152 B2 * | 2/2008 | Horwitz et al. ............ 340/10.1 |
| 7,394,358 B2 * | 7/2008 | Cherry ....................... 340/505 |
| 2001/0030232 A1 * | 10/2001 | Piatek ........................ 235/375 |
| 2001/0041948 A1 * | 11/2001 | Ross et al. .................. 700/226 |
| 2002/0070862 A1 * | 6/2002 | Francis et al. ............ 340/572.1 |
| 2002/0130778 A1 * | 9/2002 | Nicholson ................ 340/572.1 |
| 2002/0134836 A1 * | 9/2002 | Cash et al. .................. 235/385 |
| 2002/0138352 A1 * | 9/2002 | DeMaggio .................... 705/22 |
| 2002/0153418 A1 * | 10/2002 | Maloney ..................... 235/384 |
| 2003/0083964 A1 * | 5/2003 | Horwitz et al. ............... 705/28 |
| 2003/0117268 A1 | 6/2003 | Hewitt et al. |
| 2003/0144926 A1 * | 7/2003 | Bodin et al. .................. 705/28 |
| 2003/0149644 A1 * | 8/2003 | Stingel et al. ................. 705/28 |
| 2003/0158796 A1 * | 8/2003 | Balent .......................... 705/28 |
| 2003/0201321 A1 * | 10/2003 | Maloney ..................... 235/384 |
| 2003/0233165 A1 | 12/2003 | Hein et al. |
| 2004/0102869 A1 * | 5/2004 | Andersen et al. ............ 700/215 |
| 2004/0128134 A1 * | 7/2004 | Sacks et al. .................. 704/270 |
| 2004/0139806 A1 * | 7/2004 | Christmas .............. 73/862.041 |
| 2004/0143505 A1 * | 7/2004 | Kovach ........................ 705/23 |
| 2004/0181310 A1 * | 9/2004 | Stashluk et al. ............. 700/226 |
| 2004/0182650 A1 * | 9/2004 | Harris et al. .................. 186/66 |
| 2004/0199285 A1 * | 10/2004 | Berichon et al. ............ 700/225 |
| 2004/0206810 A1 * | 10/2004 | Yamagiwa .................. 235/376 |
| 2004/0232691 A1 * | 11/2004 | Lazzerini ..................... 283/67 |
| 2005/0035860 A1 * | 2/2005 | Taylor et al. ............. 340/572.1 |
| 2005/0052281 A1 * | 3/2005 | Bann ..................... 340/539.13 |
| 2005/0065861 A1 * | 3/2005 | Bann ............................ 705/28 |
| 2005/0071234 A1 * | 3/2005 | Schon ......................... 705/22 |
| 2005/0076816 A1 * | 4/2005 | Nakano ................... 108/51.11 |
| 2005/0109845 A1 * | 5/2005 | Ghaffari ..................... 235/385 |
| 2005/0237843 A1 * | 10/2005 | Hyde ......................... 365/228 |
| 2005/0242169 A1 * | 11/2005 | Michal, III .................. 235/375 |
| 2005/0256775 A1 * | 11/2005 | Schapler et al. ............... 705/22 |
| 2005/0284934 A1 * | 12/2005 | Ernesti et al. ............... 235/385 |
| 2005/0289020 A1 * | 12/2005 | Bruns et al. ................... 705/28 |
| 2006/0011721 A1 * | 1/2006 | Olsen et al. ................. 235/385 |
| 2006/0020529 A1 * | 1/2006 | Chao et al. .................... 705/35 |
| 2006/0022800 A1 * | 2/2006 | Krishna et al. ............. 340/10.2 |
| 2006/0049249 A1 * | 3/2006 | Sullivan ..................... 235/385 |
| 2006/0058913 A1 * | 3/2006 | Andersen et al. ............ 700/214 |
| 2006/0071072 A1 * | 4/2006 | McDonald .................. 235/385 |
| 2006/0106742 A1 * | 5/2006 | Bochicchio et al. ......... 705/414 |
| 2006/0150851 A1 * | 7/2006 | Bremond et al. ............ 101/484 |
| 2006/0170565 A1 * | 8/2006 | Husak et al. ........... 340/825.49 |
| 2006/0182552 A1 * | 8/2006 | Jiang et al. .................. 414/278 |
| 2006/0192003 A1 * | 8/2006 | Chung ........................ 235/385 |
| 2006/0208890 A1 * | 9/2006 | Ehrman et al. ........... 340/572.1 |
| 2006/0208893 A1 * | 9/2006 | Anson et al. ............. 340/572.1 |
| 2006/0232412 A1 * | 10/2006 | Tabacman et al. ......... 340/572.1 |
| 2006/0255948 A1 * | 11/2006 | Runyon et al. ........... 340/572.7 |
| 2006/0255949 A1 * | 11/2006 | Roeder et al. ............ 340/572.7 |
| 2006/0255951 A1 * | 11/2006 | Roeder et al. ............ 340/572.7 |
| 2006/0287759 A1 * | 12/2006 | Charych ..................... 700/213 |
| 2006/0292984 A1 * | 12/2006 | Teate et al. .................. 455/41.2 |
| 2007/0000990 A1 * | 1/2007 | Baldassari et al. .......... 235/375 |
| 2007/0001809 A1 * | 1/2007 | Kodukula et al. ........... 340/10.1 |
| 2007/0005459 A1 * | 1/2007 | Fowler ........................ 705/28 |
| 2007/0013480 A1 * | 1/2007 | Kantrowitz et al. ........ 340/5.92 |
| 2007/0040682 A1 * | 2/2007 | Zhu et al. .................. 340/572.1 |
| 2007/0069017 A1 * | 3/2007 | Magens et al. .............. 235/385 |
| 2007/0096919 A1 * | 5/2007 | Knadle et al. ............ 340/572.8 |
| 2007/0135961 A1 * | 6/2007 | Ishida et al. ................. 700/213 |
| 2007/0156536 A1 * | 7/2007 | Alfandary et al. .............. 705/22 |
| 2007/0164863 A1 * | 7/2007 | Himberger et al. ....... 340/572.1 |
| 2007/0187496 A1 * | 8/2007 | Andersen et al. ............ 235/385 |
| 2007/0210923 A1 * | 9/2007 | Butler et al. ............... 340/572.8 |
| 2007/0215700 A1 * | 9/2007 | Reznik et al. ................ 235/385 |
| 2007/0282482 A1 * | 12/2007 | Beucher et al. ............. 700/225 |
| 2007/0296585 A1 * | 12/2007 | Ishida et al. .............. 340/572.1 |
| 2008/0001748 A1 * | 1/2008 | Childress et al. ......... 340/572.1 |
| 2008/0024274 A1 * | 1/2008 | Ishida et al. ................ 340/10.1 |
| 2008/0068170 A1 * | 3/2008 | Ehrman et al. ........... 340/572.1 |
| 2008/0100445 A1 * | 5/2008 | Horwitz et al. .......... 340/572.1 |
| 2008/0319843 A1 * | 12/2008 | Moser et al. .................. 705/14 |

* cited by examiner

605

Resource Table

| GUID | Resource Type | User Name | Status |
|------|---------------|-----------|--------|
| R1   | forklift      | W1        | active |
| R2   | trolley       | W2        | inactive |
| R3   | human         | W3        | active |

FIG. 6

Stock Quantity Table — 705

| GUID | Parent | Unit | Quantity | Node |
|------|--------|------|----------|------|
| S1 | H1 | PC | 12 | X4 |
| S2 | H1 | PC | 12 | X3 |
| S3 | R3 | Box | 2 | X2 |

FIG. 7

Stock Index Table

| GUID | Material Number | Batch | Category | Owner |
|------|-----------------|-------|----------|-------|
| S1 | Mat 1 | B1 | blocked | O1 |
| S2 | Mat 1 | B2 | received | O2 |
| S3 | Mat 2 | B2 | received | O2 |

| HU Index Table | |
|---|---|
| GUID | HU Identifier |
| H1 | 4711 |
| H2 | 4712 |
| H3 | 4713 |

| Location Index Table | | | |
|---|---|---|---|
| GUID | Warehouse Number | Storage Type | Location Number |
| L1 | 001 | 010 | 120 |
| L2 | 001 | 010 | 130 |
| L3 | 001 | 005 | 140 |

Location and Heirarchy Table

| ID | Index | Type | Parent | Parent Index | Parent Type | Level | Node |
|---|---|---|---|---|---|---|---|
| S1 | 002 | S | H1 | 001 | H | 1 | X4 |
| S1 | 002 | S | L2 | 001 | L | 2 | X4 |
| S1 | 002 | S | Root | | | 3 | X4 |
| S2 | 002 | S | H1 | 001 | H | 1 | X3 |
| S2 | 002 | S | L2 | 001 | L | 2 | X3 |
| S2 | 003 | S | Root | | | 3 | X3 |
| H1 | 001 | H | L2 | 001 | L | 1 | X2 |
| H1 | 001 | H | Root | | | 2 | X2 |
| L1 | 001 | L | Root | | | 1 | X1 |

METHODS AND SYSTEM FOR MANAGING STOCK

BACKGROUND OF THE INVENTION

I. Field of the Invention

The present invention relates to methods and systems for managing stock, such as stock in a warehouse or storage facility. More particularly, the present invention relates to methods and systems for managing stock and providing visibility of the location of stock, including during its transport in a warehouse.

II. Background Information

A typical warehouse includes storage areas for storing stock. Such storage areas may include rows of shelves that accommodate a large number of storage bins. The storage bins on each shelf are usually labeled, as are the rows, for ease of identification. By knowing the relevant row and bin information, it is possible for warehouse workers to locate stock in the warehouse. In such cases, the row and bin of the desired stock is used like an address to locate the stock.

During normal warehouse operations, there can be many requests for different stock items each day. In addition, stock is often moved from one location in the warehouse to another for a variety of reasons. For example, it may be necessary to move stock from one bin location to another to better organize the stock, to locate certain stock in an area for inspection, and/or to prepare the stock for shipment outside of the warehouse.

Typically, requests to move stock are issued as transfer orders. When a warehouse worker is given a transfer order, the worker must first locate the desired stock. A transfer order to transfer stock to a new location usually includes the stock's storage location, which is based on row and bin information retrieved from, for example, a computerized inventory system. Such a system maintains location information describing where stock is located in the warehouse.

After receiving the transfer order, a warehouse worker will determine the location of the stock and travel to that location using the stock's row and bin information. The particular stock requested in the transfer order is then identified.

Once the worker has located the stock, the worker may need to use a resource, such as a forklift, to transport the stock to its new location. Upon moving the stock from its current location, the worker may use a scanner to scan a bar code or radio frequency identification (RFID) on the bin to confirm the pickup of the piece(s) of stock. Typically, the worker will use a scanner to scan a bar code or RFID located on the stock itself and a bar code or RFID located on the bin when picking up the stock. Once the worker has scanned these items, the information is transmitted and a database in the computerized inventory system is updated to indicate that the particular stock is no longer located in the bin.

Once the stock arrives at its new location, the worker may use the scanner to update the stock's location. For example, the worker may accomplish this by scanning the bar code or RFID located on the stock and scanning the bar code or RFID associated with the stock's new bin location. As a consequence, the stock inventory database is updated to indicate that the moved stock is now located in its new bin location in the warehouse.

While the bin location of the stock is typically recorded, information concerning the location of the stock during its movement to a new location is not recorded or otherwise available. This is due to the stock not being tracked or assigned to a location during its transport. As a result, most computerized inventory systems do not provide visibility as to a stock's location until the stock has finally reached its new location and been registered in the stock inventory database.

Due to the size of many modern warehouses, transferred stock may spend a substantial amount of time in transit to its new location. Thus, throughout the day, most computerized inventory systems may not include the most current or complete information on the location of stock in the warehouse. Should another warehouse worker attempt to locate certain stock that is in transit by consulting the database, the worker will be not be able to identify or determine the location of that stock. Further, due to the often long transfer times to move stock within a warehouse, such a situation can result in a substantial time delay during which workers cannot locate needed stock.

Computerized inventory systems also suffer from other drawbacks. For example, due to the rapid and fluid environment of modern warehouses, workers often receive instructions to change the destination of stock that has already been picked-up and is in the process of being transferred to another location. However, once the stock has been picked-up from its original storage location, it is not possible to determine the worker or resource being used to move it. It thus becomes necessary to wait until the worker moves the stock to its new location and updates the inventory database before workers can locate the stock. In a busy warehouse environment, this could result in substantial delays and inefficiencies due to the inability to rapidly locate stock and respond to urgent stock needs or change transfer orders.

In view of the foregoing, there is a need for systems and methods for providing visibility of the location of stock at all times, including during its transport in a warehouse. There is also a need for improved systems and methods for managing stock in a warehouse, including the ability to monitor and alter the destination of stock while it is in transit.

SUMMARY OF THE INVENTION

Consistent with embodiments of the present invention, methods and systems are disclosed for providing stock visibility, including providing information identifying the location of stock while it is being transported to a new location. Systems and methods are also provided, consistent with the invention, for altering the destination of stock while it is in transit to a new location.

In accordance with one embodiment, a method is provided for managing stock in a warehouse. The method may comprise: providing a stock identifier to identify stock stored in the warehouse; providing a bin identifier to identify a bin in the warehouse; providing a resource identifier to identify a resource; associating the stock identifier with the resource identifier when the stock is being transported with the resource; and associating the stock identifier with the bin identifier when the stock is stored in the bin.

In accordance with another embodiment, a method is provided for managing stock in a warehouse using a database. The method may comprise: issuing a transfer order to move stock from a first bin to a second bin, the stock being identified in the database with a stock identifier; prior to execution of the transfer order, associating the stock identifier with a first bin identifier in the database to identify the stock as being stored in the first bin; and updating the database, during execution of the transfer order, to associate the stock identifier with a resource identifier for a resource transporting the stock to the second bin in accordance with the transfer order.

In accordance with another embodiment, a system is provided for managing stock in a warehouse. The system may comprise: a plurality of records identifying bins in the warehouse; a plurality of records identifying resources in the warehouse; and a warehouse management module for associating a stock identifier for stock with a corresponding one of the plurality of records identifying a bin location where the stock is stored and, when the stock is removed from the bin location and transported with a resource, associating the stock identifier with a resource identifier for the resource to thereby provide visibility of the stock during its transport.

In accordance with another embodiment, a system is provided for managing stock in a warehouse. The system may comprise: means for providing a stock identifier to identify stock stored in the warehouse; means for providing a bin identifier to identify a bin in the warehouse; means for providing a resource identifier to identify a resource; means for associating the stock identifier with the resource identifier when the stock is transported by the resource; and means for associating the stock identifier with the bin identifier when the stock is stored at the bin.

In accordance with yet another embodiment, a computer readable medium is provided that comprises instructions for performing a method for managing stock in a warehouse. The method may comprise: issuing a transfer order to move stock from a first bin location to a second bin location, the stock being identified in a database with a stock identifier; prior to execution of the transfer order, associating the stock identifier with a first bin identifier in the database to identify the stock as being stored in the first bin location; updating the database, during execution of the transfer order, to associate the stock identifier with a resource identifier for a resource transporting the stock to the second bin location in accordance with the transfer order; and further updating the database to associate the stock identifier with a second bin identifier when the stock has been transported to and stored in the second bin location.

It is to be understood that both the foregoing general description and the following detailed description are exemplary and explanatory only, and should not be considered restrictive of the scope of the invention, as described and claimed. Further, features and/or variations may be provided in addition to those set forth herein. For example, embodiments of the invention may be directed to various combinations and sub-combinations of the features described in the detailed description.

BRIEF DESCRIPTION OF THE DRAWINGS

The accompanying drawings, which are incorporated in and constitute a part of this disclosure, illustrate various embodiments and aspects of the present invention. In the drawings:

FIG. 6 is an exemplary resource table used to define resources, consistent with an embodiment of the present invention;

FIG. 7 is an exemplary stock table used to define stock, consistent with an embodiment of the present invention;

FIG. 8 is an exemplary stock index table, consistent with an embodiment of the present invention;

FIG. 9 illustrates an exemplary HU index table, consistent with an embodiment of the present invention;

FIG. 10 illustrates an exemplary location index table, consistent with an embodiment of the present invention; and FIG. 11 illustrates an exemplary location and hierarchy table, consistent with an embodiment of the present invention.

DETAILED DESCRIPTION

Figure 1:
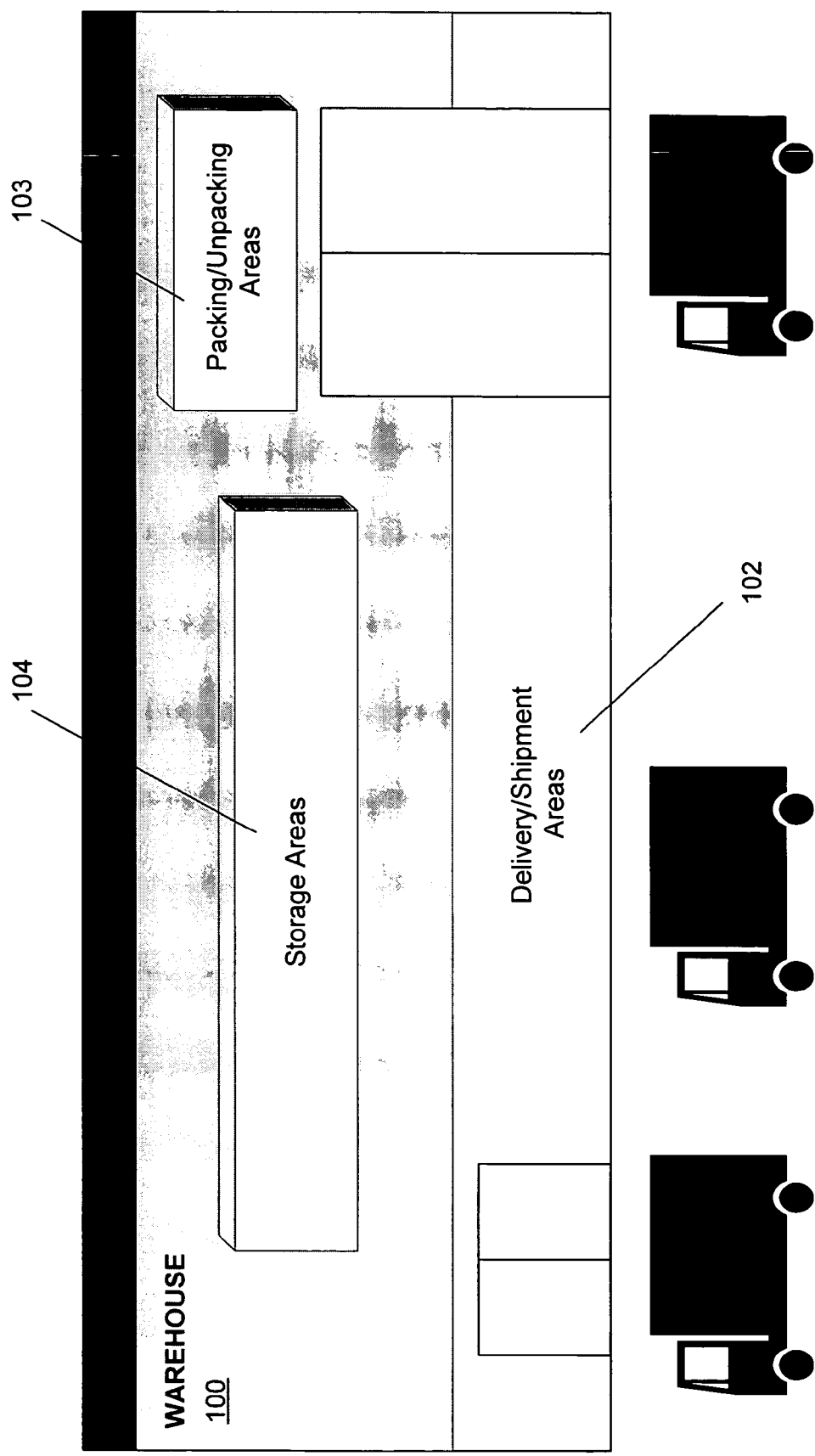
FIG. 1 is a diagram of an exemplary warehouse management environment in which systems and methods for managing stock may be implemented, consistent with the present invention.

The following detailed description refers to the accompanying drawings. Wherever possible, the same reference numbers are used in the drawings and the following description to refer to the same or similar parts. While several exemplary embodiments and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering, or adding steps to the disclosed methods. Accordingly, the following detailed description does not limit the invention. Instead, the proper scope of the invention is defined by the appended claims.

Systems and methods consistent with embodiments of the present invention provide stock visibility, including providing information identifying the location of stock while it is being transported to a new location. Systems and methods are also provided, consistent with the invention, for altering the destination of stock while it is in transit to a new location.

As used herein, the term "stock" refers to any element or quantity of stock in a warehouse or other facility. By way of example, stock may comprise any quantity or number of parts for manufacturing or providing a finished product, or any quantity or number of parts that are used for providing services. Stock elements may also comprise commercial products or items, such as books, office supplies, articles of clothing, electronic devices, home appliances or other merchandise. By way of further example, in the context of a warehouse environment for an automotive or machinery supplier, stock may comprise automotive parts, engine parts, heavy equipment parts and the like.

As disclosed herein, systems and methods are provided for managing stock in a warehouse or other facility. For purposes of illustration, FIG. 1 illustrates an exemplary warehouse environment, in which systems and methods consistent with the present invention may be implemented.

In FIG. 1, a warehouse 100 is shown that serves as a facility for handling and storing stock. In one embodiment, warehouse 100 may function as the main warehouse facility of a supplier or merchant of goods or services. In other embodiments, warehouse 100 may be one of several warehouse facilities that are regionally located and/or part of a distribution network. Additionally, or alternatively, warehouse 100 may be co-located with a store-front or other location for selling or otherwise providing goods or services to customers, such as warehouse stores, dealerships and other types of customer locations. Thus, warehouse 100 does not need to be a separately or remotely located storage facility.

Warehouse 100 may include a number of areas. For example, warehouse 100 may include one or more delivery and/or shipment areas 102 for receiving and shipping stock. Delivery/shipment areas 102 may include dock areas where shipping vehicles (e.g., shipping trucks, vans and the like) are received. As is customary, these dock areas may be used for the unloading or loading of pallets or handling units of stock.

As further shown in FIG. 1, warehouse 100 may also include other areas, such as one or more packing and/or unpacking areas 103. Packing/unpacking areas 103 may include areas where warehouse workers pack or unpack stock from the handling units. Areas 103 can be used in combination with delivery/shipment areas 102 to facilitate deliveries and shipment of stock to and from warehouse 100. In addition, one or more storage areas 104 may be provided for storing stock in the warehouse. Storage areas 104 may include a large number of storage bins that are arranged, for example, in rows of shelves (not shown). Additionally, or alternatively, other types of storage elements (such as containers, buckets, barrels and the like) may be used in storage areas 104.

Conventional techniques may be used for organizing and storing stock in storage areas 104. For example, the bins or other storage elements in areas 104 may be labeled for ease of identification. Labeling may be achieved through the use of any type of indicia or label, such as bar code labels or RFIDs. In addition to labeling the bins or storage elements, each storage area (e.g., each row of shelf space, etc.) in areas 104 may be labeled or otherwise marked. Thus, by knowing the relevant row and bin information, it is possible for warehouse workers to locate stock in the warehouse.

To control the movement of stock in warehouse 100, one may use a computerized inventory management system (not shown in FIG. 1). Such a system may maintain the location information (e.g., row and bin information) for all stock in the warehouse. The system may also maintain and issue transfer orders to instruct warehouse workers on the required movements of stock in the warehouse. The computerized inventory system may include a warehouse management engine or module that includes software-enabled logic and a database (see, e.g., FIG. 2). In one embodiment, the system is implemented with a software-based, warehouse management module that is part of a supply chain management (SCM) system or other operating environment.

Consistent with the present invention, warehouse 100 may be, but need not be, owned and operated by a supplier or merchant. One of ordinary skill in the art will recognize, however, that the relationship between warehouse 100 and a supplier or merchant may take many forms and is therefore not critical to the present invention. For instance, warehouse 100 may be owned or operated by a third party or entity on behalf of a supplier or merchant. These and other forms of ownership or operation may be provided so long as the stock management systems and methods are performed in accordance with the teachings hereof.

Figure 2:
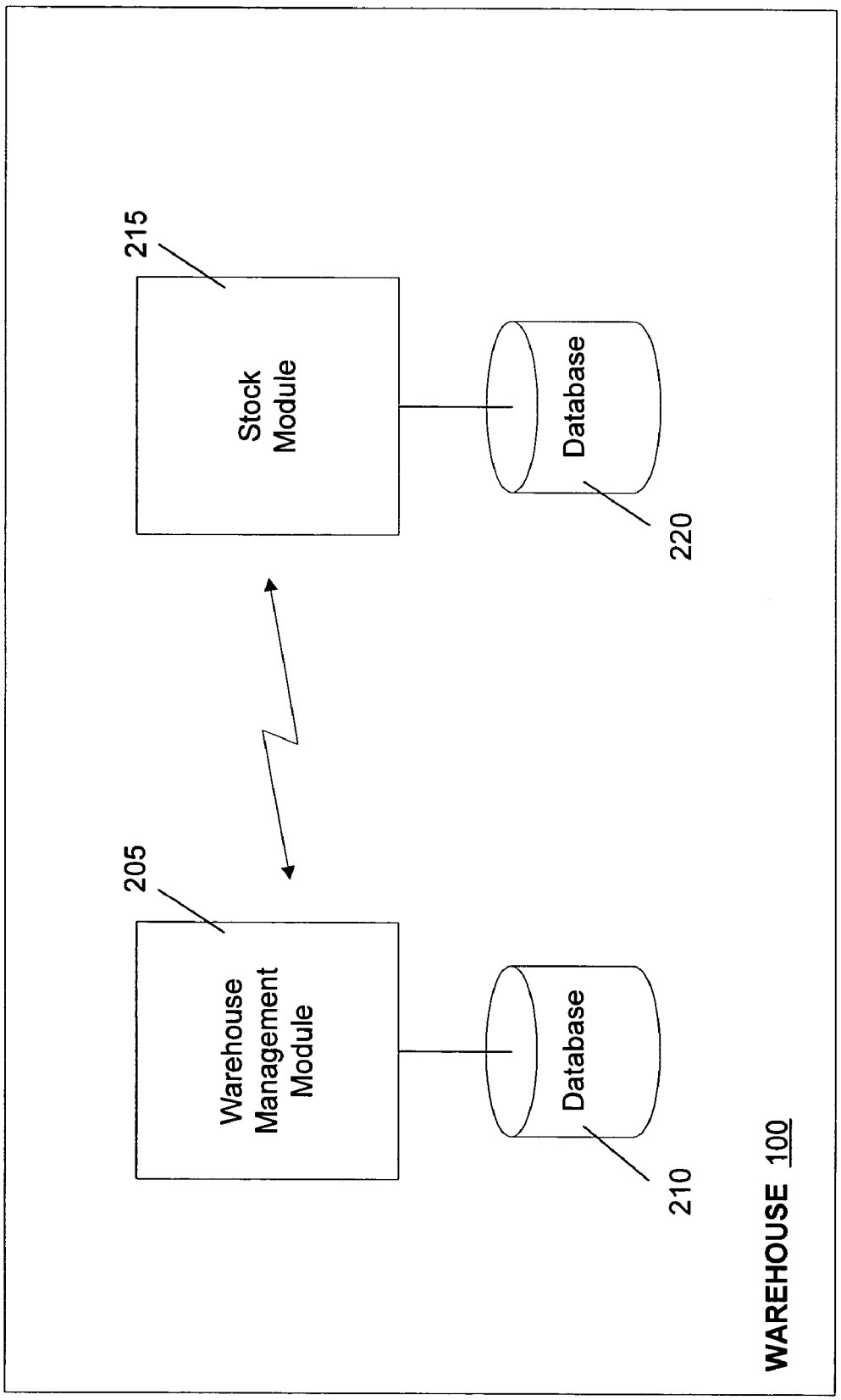
FIG. 2 is a diagram of an exemplary warehouse environment that includes a warehouse management module, consistent with an embodiment of the present invention.

By way of further example, FIG. 2 illustrates an exemplary environment for a warehouse (such as warehouse 100 of FIG. 1). Consistent with the present invention, the exemplary embodiment of FIG. 2 includes a warehouse management module or engine 205. Similar to the computerized systems described above, warehouse management module 205 may include software-based logic for managing the day-to-day operations of the warehouse, including the movement of stock in and out the warehouse. Warehouse management module 205 may be implemented with a computing-based platform (e.g., a workstation, a computer, a laptop, a server, a network computer and the like) and include a database 210 for storing data consistent with the teachings of the present invention.

As further shown in FIG. 2, warehouse management module 205 may interface or communicate with other components or modules. For example, if stock data for the warehouse is managed separately with a stock engine or module 215, an interface may be provided between modules 205 and 215. In such a case, stock module 215 may include and maintain its own database 220 with stock data. An interface between modules 205 and 215 may be provided that includes an index table to provide keys for mapping stock data held under module 215 with the logic of warehouse management module 205. Exemplary embodiments of the structure of such data and tables are provided below with reference to, for example, FIGS. 6-11. Examples of software for implementing stock module 215 include the Stock Engine or Line Inventory Management Engine (LIME) for the R/3 system, available from SAP AG (Walldorf, Germany).

As will be appreciated by those skilled in the art, the warehouse management module 205 may be an integrated solution and, in such cases, a separate stock engine (such as stock engine or module 215) may not be necessary. Thus, consistent with embodiments of the invention, stock data may be integrated and stored in database 210 of warehouse management module 205. Further, although not shown in FIG. 2, standard I/O interfaces and communication means may be provided to facilitate the entry, output and communication of data with warehouse management module 205, including the communication of module 205 with other components or modules (such as stock module 215). Thus, for example, conventional keyboard(s) and display screen(s) may be provided to permit warehouse operators and workers to view and/or enter data. Further, terminals and other components may be networked with warehouse module 205 to permit the entry or viewing of data from any location within the warehouse. Such networked arrangements may be implemented through wired or wireless networks (e.g., intranets, WANs, LANs, Wi-Fi, RF and other wireless networks, etc.).

The components illustrated in FIG. 2 may be physically located at the warehouse or located remotely from the warehouse at, for example, a head office or management facility. Therefore, the location of warehouse management module 205 and other components are not critical for implementing systems and methods consistent with the present invention.

Figure 3:
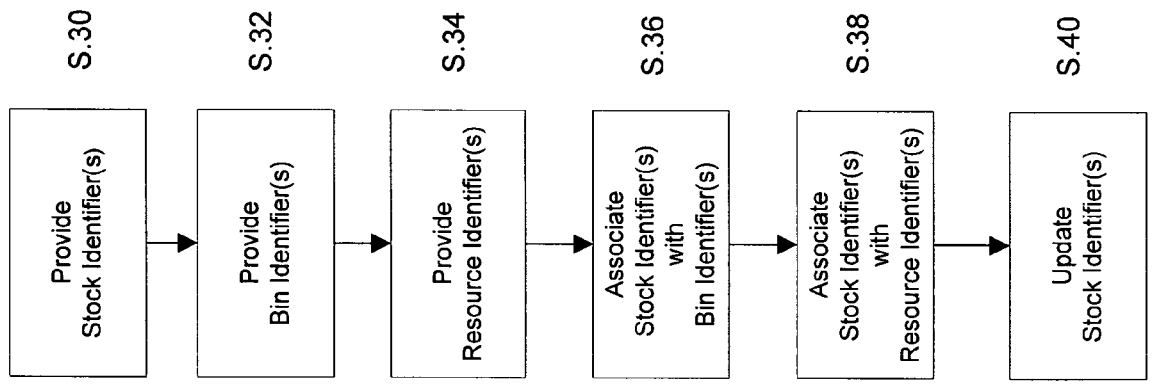
FIG. 3 is a flowchart of an exemplary method for managing stock, consistent with an embodiment of the present invention.

FIG. 3 is a flowchart of an exemplary method for managing stock in a warehouse, consistent with an embodiment of the present invention. The exemplary method of FIG. 3 may be implemented to provide visibility as to the location of stock at all times, including during its transport in the warehouse. While the embodiment of FIG. 3 is described with respect to providing stock visibility in a warehouse, it will be appreciated by those skilled in the art that the exemplary method may be applied to other facilities and environments where the management and tracking of stock or other elements are required.

As shown in FIG. 3, stock identifier(s) may be provided to identify stock in the warehouse (step S.30). Consistent with the present invention, a stock identifier may comprise a data structure or record that provides information to identify any element or quantity of stock. A stock identifier may be created when stock is checked-in or delivered to the warehouse. The stock identifier may be stored in a database and managed by a computerized inventory system. For example, with reference to the exemplary embodiment of FIG. 2, stock identifiers may be created and managed by warehouse management module 205, either alone or in combination with stock module 215. In one embodiment, stock identifiers or records are created and managed by warehouse management module 205, with some or a particular set of the stock data being indexed and stored in stock module 215.

Each stock identifier may comprise various types or categories of data for identifying the stock. Such data may be organized into tables or any other suitable data structure. By way of example, a stock identifier may include data indicating the name or owner of the stock and the basic characteristics of the stock (e.g., weight, volume, dimensions, shelf life or expiration date, etc.). Additionally, or alternatively, the stock identifier data may include a stock number, an inspection or warehouse log number, a goods received date and/or stock status data (e.g., free, blocked, etc.).

In addition to providing the stock identifier(s), bin identifier(s) may be provided to identify the bin(s) in the warehouse (step S.32). Consistent with the present invention, a bin identifier may comprise a data structure or record that provides information to identify a bin for storing an element or quantity of stock. A bin identifier may be created for each bin in the warehouse. Further, similar to the stock identifier(s), the bin identifier(s) may be stored in a database and managed by a computerized inventory system. For example, with reference to FIG. 2, bin identifiers may be created and managed by warehouse management module 205.

As will be appreciated by those skilled in the art, the present invention is not limited to the use of bin identifier(s). In addition or as an alternative to bin identifier(s), identifiers may be provided for other storage elements (such as containers, buckets, barrels and the like). For the ease of reference, however, aspects of the invention will be described hereinafter with reference to bins and bins identifiers. Thus, the term "bin" should be considered to cover any type of storage element.

Consistent with the present invention, each bin identifier may comprise various types or categories of data for identifying the bin. Such data may be organized into tables or any other suitable data structure. By way of example, a bin identifier may include data indicating the location of the bin (e.g., storage lane and/or row) and the basic characteristics of the bin (e.g., dimensions, weight restrictions, resource or access restrictions, etc.). Additionally, or alternatively, the bin identifier data may include a bin number, bin type (refrigerated, non-refrigerated, etc.) and/or bin status data (e.g., occupied, vacant, etc.).

Referring again to FIG. 3, resource identifier(s) may also be provided to identify resources in the warehouse (step S.34). Consistent with the present invention, a resource identifier may comprise a data structure or record that provides information to identify resources for moving or handling any element or quantity of stock. A resource identifier may be created for each resource in the warehouse. Resource identifiers may be stored in a database and managed by a computerized inventory system. For example, with reference again to the exemplary embodiment of FIG. 2, resource identifiers may be created and managed by warehouse management module 205.

As used herein, the term "resource" refers to any equipment, device or entity for moving, transporting or otherwise handling stock. Resources may include, for example, light and heavy capacity forklifts operated by human operators, automatically controlled forklifts, conveyors, trolleys, push-carts, as well as warehouse workers or other human operators for manually moving or transporting stock. As will be appreciated by those skilled in the art, the above-identified resources are merely examples and type of resource may be used in combination with the teachings of the present invention.

As with the stock and bin identifiers, each resource identifier may comprise various types or categories of data. Such data may uniquely identify a resource and be organized into tables or any other suitable data structure. By way of example, a resource identifier may include data indicating a resource ID or number, a resource name, a resource type, a user name (e.g., name or employee number of human operator) and the basic characteristics of the resource (e.g., maximum weight restrictions, actual weight on the resource, etc.). Additionally, or alternatively, the bin identifier data may include resource status data (e.g., active, inactive, etc.).

Consistent with the present invention, stock identifier(s) are associated with corresponding bin identifier(s) (step S.36) or corresponding resource identifier(s) (step S. 38). In the former case, stock identifier(s) that identify stock that are stored in bins are associated with bin identifier(s) that identify the corresponding bins in which the stock is stored. In the later case, stock identifier(s) that identify stock that are being transported or otherwise handled by resources are associated with resource identifier(s) that identify the corresponding resources that are transporting or handling the stock. As a result, each stock identifier is associated with a bin identifier or a resource identifier depending on its location. Thus, regardless of the status of the stock, an examination of the stock identifier will always provide visibility as to the location of the stock (i.e., stored in a bin or in transport with a resource).

During warehouse operations, updates to the stock identifier(s) may be made, as required or needed (step, S.40). For example, assume that a stock identifier for a stock element is associated with a resource identifier that identifies a resource transporting the stock element. When that stock element is transferred by the resource and stored at a new bin, the registration of stock with the bin may be made with the warehouse management module (such as warehouse management module 205). In response, the warehouse management module may reassign the stock identifier for the stock so that it is associated with the bin identifier for the new bin where the stock is stored. Thus, an update can be made to reassign the stock identifier from the resource identifier to the appropriate bin identifier.

The warehouse management module can also make updates when stock is removed from a bin location. By way of example, assume there is a transfer order to move stock from a first bin to a second bin. When a warehouse worker removes the stock from the first bin with a resource (such as forklift), the registration of the pick-up may be made with the warehouse management module. At this point, an update to the database will be made to associate the stock identifier for the stock with the resource identifier for the resource transporting the stock. When the stock is relocated to the second bin and registered with the warehouse management module, another update may be made so that the stock identifier is associated with a bin identifier for the second bin.

Registrations of the location of stock (e.g., in a bin or with a resource) may be implemented in various ways. For example, in one embodiment, bar codes and/or RFIDs are used to label and identify stock, bins and/or resources. During a pick-up or drop of stock, these bar codes and/or RFIDs may be scanned or read with a scanner operated by a warehouse worker and the collected data communicated (e.g., using a wireless link, a wired network, etc.) back to the warehouse management module to register the location of the stock and trigger an update to the database. Alternatively, or additionally, a warehouse operator may radio or call-in the updates to a central office where a human operator manually enters the updates into the warehouse management module.

To associate a stock identifier with a bin or resource identifier, various techniques may be employed. By way of example, in a database maintained by warehouse management module, a table may be provided to associate each stock identifier with either a bin identifier or a resource identifier. In another embodiment, a relational database is maintained, wherein stock identifier(s) are stored and associated with bin or resource identifier(s). In still another embodiment, each stock identifier may include a pointer or link that associates it with a bin identifier or resource identifier. As will be appreciated, the above-identified approaches are merely examples and other database techniques and approaches may be utilized to associate identifiers, consistent with the present invention.

Figure 4:
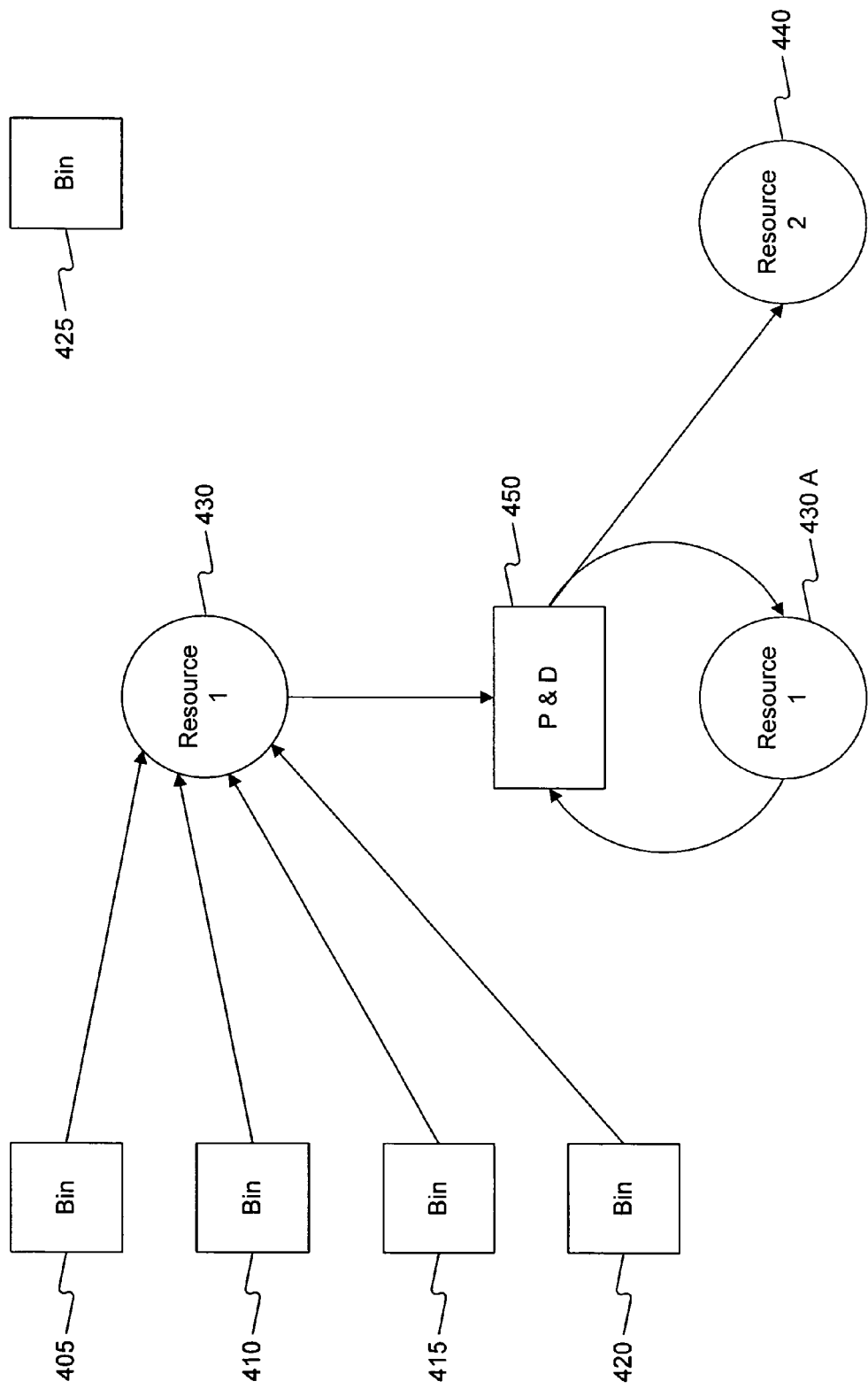
FIG. 4 is a diagram of an exemplary warehouse environment in which systems and methods for managing stock may be implemented, consistent with an embodiment of the present invention.

To further illustrate systems and methods consistent with the present invention, reference will now be made to the exemplary embodiment of FIG. 4. In FIG. 4, an exemplary warehouse environment is shown. As illustrated in FIG. 4, the exemplary warehouse environment may comprise a plurality of bins 405-420. Bins 405-420 may be configured in a row, for example. When stock is removed from one of bins 405-420, a bar code scan or RFID sweep occurs. The bar code scan or RFID sweep may involve a warehouse worker scanning or reading a bar code or RFID label on the bin containing the stock, on the stock itself, and/or on a resource operated by the warehouse worker. As disclosed herein, a resource may comprise any type of resource for transporting, moving or otherwise handling stock in the warehouse. Examples of resources include, for example, light and heavy capacity forklifts, conveyors, trolleys, pushcarts, as well as human operators for manually moving stock.

For the purposes of the following example, assume that a warehouse worker receives a transfer order requesting that certain stock be transported from one or more of bins 405-420 to bin 425. As shown in FIG. 4, stock is picked-up by resource 1 from bins 405-420, and moved to position 430. At the time the stock is picked-up by resource 1, a warehouse management system or module (not shown) may be updated to reflect that the stock is now located on resource 1. Thereafter, a second warehouse worker may desire to locate some of the stock removed from bins 405-420. This may be due to a more urgent transfer order or a decision by warehouse management to redirect the stock. By checking the warehouse management system, the second warehouse worker will learn that the stock removed from bins 405-420 has been placed on resource 1. Accordingly, the second warehouse worker is able to learn that resource 1 is being used to move the stock and that it is no longer located in bins 405-420.

As a result, the second warehouse worker may contact the warehouse worker operating resource 1 (e.g., by radio, mobile phone or pager) to reroute certain desired stock while it is in transport on resource 1. Once the first warehouse worker is contacted, he/she may be informed to transport all or a certain quantity of the stock on resource 1 to pick and drop location 450. At pick and drop location 450, resource 1 will drop-off the requested stock and register the same with the warehouse management system. This may trigger an update to the appropriate stock identifier(s) so that they become associated with an identifier for pick and drop location 450. The identifier for pick and drop location 450 may be constructed similar to that described above for a bin identifier. When the stock transferred from resource 1 is picked-up by resource 2 from pick and drop location 450, another registration may be made with warehouse management system and an update of the stock identifier(s) may be made to associate it with a resource identifier for resource 2. Resource 2 then proceeds to location 440, where stock may be dropped-off or loaded onto a truck, for example. Stock remaining with resource 1 then proceeds to bin 425 as originally planned or, if all of the stock has been transferred, then resource 1 may move to another location to fulfill another transfer order.

Various modifications can be made to the above-described embodiment. For example, instead of redirecting resource 1 to pick and drop location 450, resource 1 could be instructed to go directly to location 440 or could be redirected to another bin. Thus, to redirect or alter stock deliveries it is not necessary to use a pick and drop location.

As disclosed herein, systems and methods consistent with the present invention provide stock visibility to allow warehouse workers to locate stock, even when it is in transport. Embodiments of the invention also enable warehouse managers and other workers to request that stock destined for a particular location be rerouted to a new location. Such visibility and control is needed because during a typical warehouse day, there may be numerous changes in transfer orders or updates to stock deliveries.

In organizing the transportation of stock in a warehouse, each transfer order may be assigned to a "work queue." A work queue describes a set of transfer orders that will be fulfilled in sequential order. More than one work queue may exist depending on activity types occurring in the warehouse. Further, each work queue may be associated with it a particular type of resource. For example, there can be one type of resource assigned to each work queue.

Warehouse workers may be assigned to a work queue at the beginning of the day. As a day starts, workers begin working through the transfer orders assigned to their work queue. Because a work queue may include many transfer orders, it could take hours before a worker fulfills a particular transfer order. However, since updates to transfer orders may be required to process put-away (e.g., physical moves) which might require a long time during the day, it is not feasible to wait until stock transfers are unloaded to their original destinations before redirecting the stock. Thus, providing stock visibility, in accordance with the present invention, enables the stock to be located and redirected as needed without substantial delay.

Figure 5B:
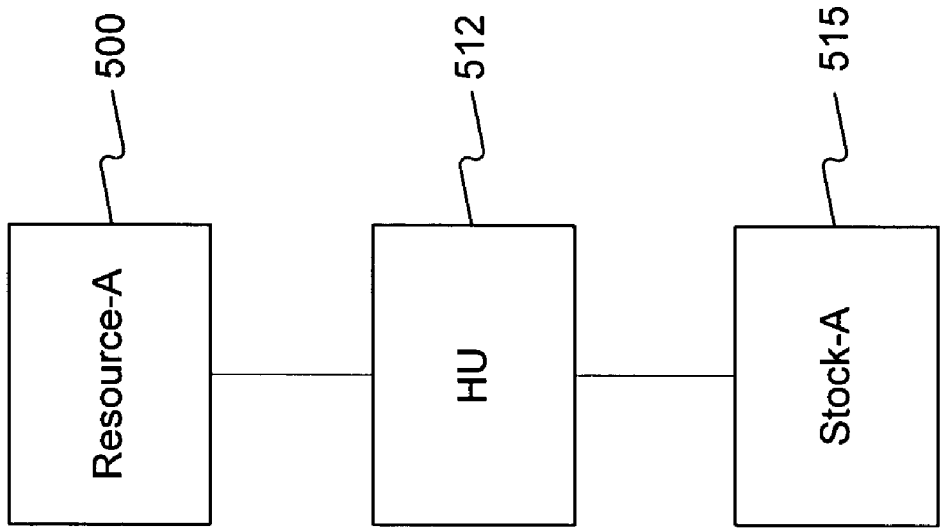
FIGS. 5A and 5B illustrate hierarchal overviews of exemplary data objects, consistent with an embodiment of the present invention.
Figure 5A:
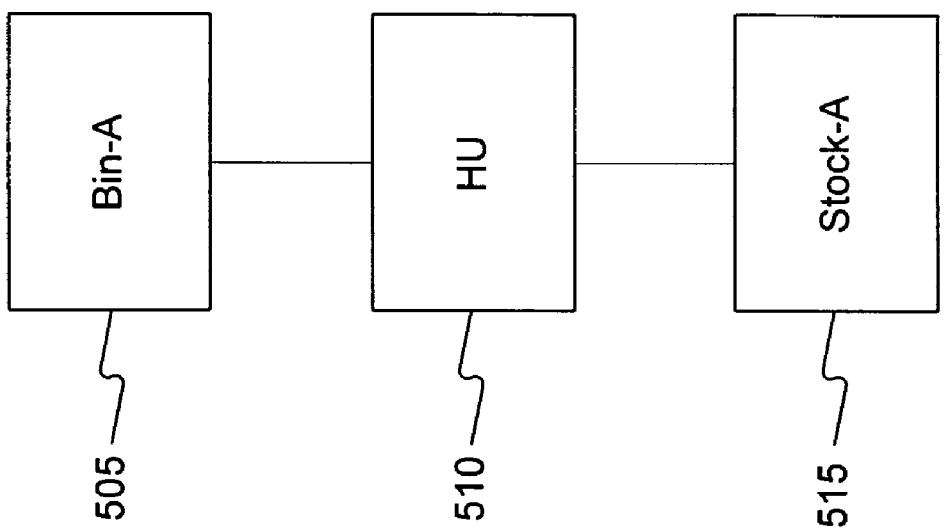

As disclosed herein, stock identifiers may be stored in the warehouse management system to identify stock. Bin and resource identifiers may also be provided for identifying bins and resources in the warehouse. Further to provide visibility of the location of stock at all times, the stock identifier(s) may be associated with bin identifier(s) or resource identifier(s) according to the location of the stock. Examples of techniques that may be used to implement these data structures have been described above. In order to further illustrate embodiments consistent with the present invention, reference will now be made to FIGS. 5A and 5B. FIGS. 5A and 5B illustrate hierarchal overviews of exemplary data objects for providing stock visibility, consistent with the principles of the present invention.

As shown in FIG. 5A, it is possible to associate stock-A with bin-A. Upon conducting a bar code or RFID sweep, for example, a stock identifier 515 for stock-A may be associated with a bin identifier 505 for bin-A. The association of stock-A may result in the updating of a location data table for describing bin-A. The location data table may be updated as a result of the bar code or RFID sweep to indicate that a record describing stock-A indicates it is located in bin-A. Additionally, a stock data table describing stock in the warehouse may also be updated to indicate that stock-A is located in bin-A.

Exemplary data tables for describing stock and bin-locations are described above and further examples are provided below.

Alternatively, as shown in FIG. 5B, stock-A may be associated with a resource-A. Once a warehouse worker retrieves stock-A from a bin, after a bar code or RFID sweep, the stock identifier 515 for stock-A may be updated and associated with a resource identifier 520 for resource-A. As indicated above, a stock data table may include a record entry for a stock identifier that describes stock-A. Resource identifier 520 is also a record stored in the warehouse management system that describes a resource (in this case resource-A). Data tables for describing resources are described above and further examples are provided below.

As shown in FIGS. 5A and 5B, the stock, bin and resource identifiers may be arranged hierarchically. In such a case, the parent or root node of each hierarchy may be a bin or resource identifier, with a stock identifier being the child node of a bin or resource identifier. Optionally, each stock identifier may also be associated with an identifier 510 for a handling unit (or HU). The term "handling unit" refers to any grouping or bundling of more than one stock element. For example, when stock arrives at a warehouse, the stock may be packaged together in a pallet or other shipping bundle, which constitutes a handling unit. After arriving at the warehouse, stock from a particular handling unit may be divided into separate stock elements, groupings or bundles. Accordingly, it may be desirable to be able to determine the handling unit that once included a particular stock element, group or bundle. An identifier or record describing a handling unit may include data stored in a table or other data structure in a database of the warehouse management system. By way of example, the data of a handling unit identifier may include data defining a unique ID for the handling unit and the name or owner of the handling unit. As shown in FIGS. 5A and 5B, if handling unit identifiers are provided, they may be hierarchically arranged between the stock identifiers and the bin and resource identifiers. Further, although not shown in the drawings, each handling unit identifier may have more than one stock identifier associated with it in a hierarchy and, furthermore, each bin or resource identifier may have one or more handling units or stock identifiers associated with it in a hierarchy.

In the exemplary embodiment of FIG. 5A, bin identifier 505 is associated with handling unit identifier 510, which is associated with stock identifier 515. For example, stock-A may be a stock element that arrived to the warehouse as part of the handling unit identified by identifier 510. As indicated above, the inclusion of handling unit identifier(s) is optional and the invention may be practiced without using handling units. If handling units are not used, handling unit identifier 510 may include no data, and may simply be a null placeholder. Optionally, handling unit identifiers may be eliminated entirely.

As shown in FIG. 5A, handling unit identifier 510 is the parent of stock-identifier 515. When stock-A is moved from one location in accordance with the requirements of a transfer order, a bar code or RFID sweep occurs. For example, a piece of stock, upon arrival at a bin, needs to have its location saved to a database that is a part of the warehouse management system. The bar code and/or RFID sweep may involve a warehouse worker scanning the barcode or RFID label associated with stock-A and bin-A. Accordingly, the database is updated to indicate that bin identifier 505 for bin-A includes stock-A identified by stock identifier 515.

When a worker receives a transfer order requesting movement of stock-A to a new location, another bar code or RFID sweep may occur. Consistent with the present invention, as a result of the bar code or RFID sweep, a resource-A may be associated with stock-A. In particular, a warehouse worker may scan the barcode of stock-A and resource-A to update the location of stock-A as being on resource-A. As shown in FIG. 5B, a resource identifier 500 for resource-A becomes the parent or root of stock identifier 515 for stock-A. Further, if handling units are implemented, a handling unit identifier 512 associated with resource-A becomes the parent of stock identifier 515. The warehouse management system is updated accordingly to reflect that stock-A is now being transported or moved by resource-A. Once stock-A arrives at its new bin location, another bar code or RFID sweep may occur, which associates stock-A with its new bin.

FIGS. 6-11 illustrate exemplary database tables for providing records and index tables to identify stock, bins, stock locations, handling units, and resources in a warehouse. Consistent with the present invention, the features of FIGS. 6-11 may be implemented in various warehouse management systems and environments, such as the exemplary embodiment of FIG. 2.

FIG. 6 illustrates an exemplary resource table used to define resources, consistent with an embodiment of the present invention. Resource table 605 may be used by a warehouse management system or module (such as warehouse management module 205) as a resource identifier or record for identifying different resources. As shown in FIG. 6, resource table 605 may include data fields for providing various types or categories of data, such as a Global Unique ID (GUID), Resource Type, User Name, and Status for a particular resource. The GUID may be any numeric or alphanumeric ID that is unique to identify a particular resource. The Resource Type field in table 605 may specify the type of resource, such as whether the resource is a light or heavy capacity forklift operated by a human operator, an automatically controlled forklift, conveyor, trolley, pushcart, or human, for example. The User Name field in table 605 may specify the user name or ID of the operator of a particular resource. The Status field may indicate the status of the resource, such as whether a resource is, for example, active or inactive.

Additionally, in embodiments consistent with the present invention, resource table 605 may include additional fields describing each resource. For example, resource table 605 may include: a client name associated with a resource; warehouse ID comprising a numeric or alphanumeric ID or code for specifying a particular warehouse in which a resource is located; a resource name or code to indicate, for example, whether the resource is equipment controlled by a human operator (e.g., resource name="Device") or a human operator alone (e.g., resource name="User"); a capacity check method code or data for specifying how the capacity of a resource is checked (such as by weight or volume); data indicating the maximum weight capacity of a resource; data indicating the unit of weight; data indicating the actual or loading weight on a resource; data indicating a maximum volume; data indicating a unit of volume; and/or data indicating an actual volume.

FIG. 7 illustrates an exemplary stock table 705 used to define stock, consistent with an embodiment of the present invention. Stock table 705 may be used by a warehouse management module (such as warehouse management module 205) as a stock identifier or record to identify stock in the warehouse. As shown in FIG. 7, stock table 705 may include a number of different data fields or categories for identifying stock in the warehouse, including the quantity of that stock in the warehouse. For example, table 705 may include a field for a GUID for stock included in the database. The GUID assigned to each stock may be used as an index for identifying particular stock data concerning the stock. Such stock data may be stored in separate database or set of tables. For example, in one embodiment, warehouse management module 205 may use the GUID to locate stock data that is managed and stored by stock module 215. In such a case, the GUID may act as an index to a stock index table (see, e.g., FIG. 8) and/or other tables with particular stock data concerning the stock.

As further shown in FIG. 7, stock table 705 may also include other data, such as: a Parent field indicating the parent node of the stock in a hierarchy (such as a stock's handling unit, if appropriate, and/or a bin or resource); a Unit field for indicating a unit of measure for the stock quantity (such as pieces (PC), a box, etc.); and/or a Quantity field indicating the quantity of stock. A Node field may also be included that contains data defining an ID or name of the node of the stock in a hierarchy. As will be appreciated from this disclosure, other stock data may be included in stock table 705 and/or other tables. Therefore, the above-identified items should be considered as examples and not limiting to the scope of the invention.

As disclosed herein, the records or identifiers of stock, handling units (if applicable), resources and bins in the warehouse may be stored in a hierarchy. The position of each stock identifier in a hierarchy may be indicated through data indicating, for example, the parent and/or other node(s) related to that stock identifier. In the exemplary embodiment of FIG. 7, the Parent field is provided for data indicating an index or ID of the parent node. In one embodiment, warehouse management module 205 may use the Parent data as an index to a database table identifying the handling unit, bin location or resource identifier that serves as a parent node. For example, assume the parent of a stock is a handling unit (such as H1 or H2). In such a case, the index or GUID for the handling unit (e.g., H1 or H2) may be used as a lookup to one or more tables (such as a handling unit (HU) index table, etc.) to locate further data related to the handling unit. An exemplary embodiment of a HU index table is provided below with reference to FIG. 9.

FIG. 8 illustrates an exemplary stock index table 805, consistent with an embodiment of the present invention. Stock index table 805 may be created and stored by warehouse management module 205 or stock module 215. By way of example, in one embodiment, stock index table 805 is stored and managed by stock module 215 and accessible to warehouse management module 205.

As shown in FIG. 8, stock index table 805 may include a number of different data fields, such as the GUID for each stock included in the database. As stated above, the GUID may be an index that is stored by a stock table (such as stock table 705 in FIG. 7) and used by warehouse management module 205 for looking-up the appropriate data from a stock index table 805. The data fields in stock index table 805 for each stock may include, for example, a Material Number field comprising data defining the material number or ID for the stock; a Batch field comprising data defining the batch number assigned or associated with the stock; a Category field comprising data defining a stock category (e.g., free, blocked, received, etc.) for the stock; and/or an Owner field comprising data defining the owner of the stock (e.g., a customer, a company, a supplier, etc.).

FIG. 9 illustrates an exemplary HU index table, consistent with an embodiment of the present invention. HU index table may be created and stored by warehouse management module 205. As indicated above, an HU index table may provide information concerning a handling unit, with each handling unit being indexed by a GUID. The GUID for a handling unit may be stored or referenced in other tables, such as a stock table (see, e.g., FIG. 7).

As shown in FIG. 9, HU index table 905 may include a number of different data fields, including a GUID field comprising data defining a GUID or code for each handling unit. HU index table 905 may also include further information about each handling unit, such as handling unit identifier. The handling unit identifier may be an alphanumeric identifier specifying a particular handling unit. The handling unit identifier may correspond to a code or bar code placed on the actual handling unit. As indicated, the use of handling units is optional and therefore, in an embodiment wherein handling units are not used, HU index table 905 may contain null placeholders, or alternatively, HU index table 905 may be omitted from the implementation.

FIG. 10 illustrates an exemplary location index table 1005, consistent with an embodiment of the present invention. Location index table 1005 may be created and stored by warehouse management module 205. Table 1005 may serve as an identifier or record for identifying bins and/or other storage locations.

As shown in FIG. 10, location index table 1005 may include a number of different data fields, such as a GUID for each bin location. The GUID may serve as an index to table 1005 for gathering further information concerning a bin location. For this purpose, location index table 1005 may include other data fields such as: a Warehouse Number field comprising data defining the number or code of a warehouse in which the bin is located; a Storage Type field comprising data indicating the type of storage area of the bin holding the stock, such as a reserve area, a staging pick-up area, a high rack bay, a goods received area, etc.; and a Location Number field comprising data defining a location number or code assigned to the bin.

FIG. 10 is an exemplary embodiment of a location table for bins and other storage locations. Other data may be included in location table 1005 and/or other tables. Therefore, the above-identified items should be considered as examples and not limiting to the scope of the invention.

FIG. 11 illustrates an exemplary location and hierarchy table 1105, consistent with an embodiment of the present invention. Location and hierarchy table 1105 may created and stored by a warehouse management module (such as warehouse management module 205) and provide location and hierarchy data.

As shown in FIG. 11, location and hierarch table 1105 may include a number of different data fields, such as an ID field comprising data defining an ID or code for each item included in the database (such as stock, a handling unit, a location or a resource). In one embodiment, the ID may correspond to a GUID for each item and be used as an index for other tables (such as a resource table, a stock table, a bin location table, a HU table, etc.; see FIGS. 6-10).

Location and hierarchy table 1105 may also provide further information for each item. For example, location and hierarchy table 1105 may also include: an Index field comprising data to describe the index of each item in the table relative to, for example, a hierarchy; a Type field comprising data to describe the type of the item in the table (e.g., stock="S"; handling unit="HU"; bin location="L"; resource="R"); a Parent field comprising data to indicate the parent node of the item in a hierarchy (which may be set to a "Root" value if no parent node exists); a Parent Index field comprising data to indicate an index of the parent node relative to a hierarchy; a Parent Type field comprising data to indicate the type of the parent node (e.g., handling unit="HU"; bin location="L"; resource="R", etc.); a Level field comprising data to indicate the level or relationship between the parent node and the item in a hierarchy (such as "1" for one level from the item in the hierarchy; "2" for second level from the item of the hierarchy, etc.); and a Node field to identify the group or node of which a particular item belongs.

In the example of FIG. 11, data is shown from four different items arranged in a hierarchy: stock S1, stock S2, handling unit H1; and location L2 (which could comprise, for example, a bin location or other storage location). Stock S1 is at the third level or bottom of the hierarchy. The parent nodes associated with stock S1 include handling unit H1 and location L2. Handling unit H1 is one level above stock S1 and location L2 is two levels above stock S1. Further, based on the exemplary data of FIG. 11, stock S2 is also at the bottom of the hierarchy and its parent nodes include handling unit H1 (one level above) and location L2 (two levels above). Moreover, handling unit H1 is located one level below location L2, which is at the root or top level of the hierarchy. Therefore, according to the example of FIG. 11, stock items S1 and S2 are associated with location L2. Should stock item S1 or S2 be moved or transferred from location L2, then the database may be updated to associate S1 or S2 with the particular resource (R1, R2, R3, etc.) that is being used for transport.

Accordingly, as disclosed, systems and methods are provided for managing stock in a warehouse and for providing stock visibility. In one embodiment, a warehouse management system may be implemented using a computerized module and a database including data tables. Data records may be defined in the tables describing the location of stock, the stock itself, resources, and optionally, handling units. Upon the removal of stock from a bin, the warehouse management system may be updated to indicate the resource being used to move the stock and, thus, provide visibility of the stock while it is in transit. In addition, by being able to identify the resource moving stock to a new location, warehouse workers can then contact the operator of the resource to request that certain stock is rerouted. As a result of being able to identify the location and resource being used to move stock, it is therefore possible to more efficiently manage warehouse operations.

While certain features and embodiments of the invention have been described, other embodiments of the invention will be apparent to those skilled in the art from consideration of the specification and practice of the embodiments of the invention disclosed herein. Furthermore, although embodiments of the present invention have been described as being associated with data stored in memory and other storage mediums, one skilled in the art will appreciate that these aspects can also be stored on or read from other types of computer-readable media, such as secondary storage devices, like hard disks, floppy disks, or a CD-ROM, or other forms of RAM or ROM. Further, the steps of the disclosed methods may be modified in any manner, including by reordering steps and/or inserting or deleting steps, without departing from the principles of the invention.

It is intended, therefore, that the specification and examples be considered as exemplary only, with a true scope and spirit of the invention being indicated by the following claims and their full scope of equivalents.

What is claimed is:

1. A method for managing stock in a storage facility, the method comprising:
   providing a stock identifier to identify stock stored in the storage facility;
   providing a first bin identifier to identify a first bin in the storage facility, wherein the stock identifier and first bin identifier are provided in at least one memory device;
   associating, by a processor, the stock identifier with the first bin identifier when the stock is stored in the first bin;
   providing a resource identifier to identify a resource, the resource causing movement of the stock;
   assigning a transfer order to the resource to move the stock from the first bin to a second bin;
   associating the stock identifier with the resource identifier when the resource identifier is scanned, at pickup of the stock by the resource;
   identifying the stock as being located with the resource when the stock identifier is associated with the resource identifier;
   redirecting the resource, when the location of the stock is identified, to transport the stock to an alternate location, wherein the alternate location includes at least one of a third bin or a pickup and drop location; and
   registering the stock at the alternate location upon completion of the redirected transport by the resource.

2. The method of claim 1, further comprising:
   updating the stock identifier to associate it with a second bin identifier when the stock has been transported to and stored in the second bin.

3. The method of claim 1, further comprising registering the location of the stock with a database.

4. The method of claim 3, wherein registering comprises reading at least one of a bar code or a radio frequency identification (RFID) associated with the bin when storing the stock in the bin.

5. The method of claim 3, wherein registering comprises reading at least one of a bar code or a radio frequency identification (RFID) associated with the resource when transporting the stock with the resource.

6. The method of claim 3, further comprising triggering an update of the stock identifier when the location of the stock with the database is registered.

7. A method for managing stock using a database, the method comprising:
   issuing a transfer order to move stock from a first bin to a second bin, the stock being identified in the database with a stock identifier;
   prior to execution of the transfer order, associating the stock identifier with a first bin identifier in the database to identify the stock as being stored in the first bin, wherein the database is located in a memory device;
   updating, by a processor, the database to associate the stock identifier with a resource identifier for a resource causing movement of the stock to the second bin in accordance with the transfer order, wherein the updating occurs when the resource identifier is scanned during execution of the transfer order, at pickup of the stock by the resource;
   identifying the stock as being located with the resource when the stock identifier is associated with the resource identifier;
   redirecting the resource, when the location of the stock is identified, to transport the stock to an alternate location, wherein the alternate location includes at least one of a third bin or a pickup and drop location; and
   registering the stock at the alternate location upon completion of the redirected transport by the resource.

8. The method of claim 7, further comprising:
   further updating the database to associate the stock identifier with a second bin identifier in the database when the stock is transferred to the second bin by the resource.

9. The method of claim 8, further comprising registering the location of the stock with a database.

10. The method of claim 9, wherein registering comprises reading at least one of a bar code or a radio frequency identification (RFID) associated with the first or second bin when storing the stock in the first or second bin.

11. The method of claim 10, further comprising triggering the further update of the database when the location of the stock in the second bin is registered with the database.

12. The method of claim 9, wherein registering comprises reading at least one of a bar code or a radio frequency identification (RFID) associated with the resource when transporting the stock with the resource.

13. The method of claim 12, further comprising triggering the update of the database when the location of the stock with the resource is registered with the database.

14. A system for managing stock in a warehouse, the system comprising:
a plurality of records identifying bins in the warehouse;
a plurality of records identifying resources in the warehouse, the resources causing movement of the stock, wherein the plurality of records identifying bins and the plurality of records identifying resources are stored in at least one memory device;
a warehouse management module, executed by a processor, for associating a stock identifier for stock with a corresponding one of the plurality of records identifying a first bin location where the stock is stored and, when the stock is removed from the first bin location and transported with a resource, associating the stock identifier with a resource identifier for the resource when the resource identifier is scanned at pickup of the stock by the resource to thereby provide visibility of the stock during its transport;
means for issuing a transfer order to transfer stock from a first bin to a second bin using the resource;
means for identifying the stock as being located with the resource when the stock identifier is associated with the resource identifier;
means for redirecting the resource, when the location of the stock is identified, to transport the stock to an alternate location, wherein the alternate location includes at least one of a third bin or a pickup and drop location; and
means for registering the stock at the alternate location upon completion of the redirected transport by the resource.

15. The system of claim 14, further comprising:
means for updating the stock identifier to associate it with a bin identifier for the second bin when it is transferred to the second bin by the resource.

16. The system of claim 14 further comprising:
means for registering the location of the stock in the warehouse.

17. The system of claim 16 wherein the means for registering comprises at least one of a bar code and a radio frequency identification (RFID).

18. A system for managing stock in a storage facility, the system comprising:
means for providing a stock identifier to identify stock stored in the storage facility;
means for providing a first bin identifier to identify a first bin in the storage facility;
means for associating the stock identifier with the first bin identifier when the stock is stored in the first bin;
means for providing a resource identifier to identify a resource, the resource causing movement of the stock;
means for assigning a transfer order to the resource to move the stock from the first bin to a second bin;
means for associating the stock identifier with the resource identifier when the resource identifier is scanned, at pickup of the stock by the resource;
means for identifying the stock as being located with the resource when the stock identifier is associated with the resource identifier;
means for redirecting the resource, when the location of the stock is identified, to transport the stock to an alternate location, wherein the alternate location includes at least one of a third bin or a pickup and drop location; and
means for registering the stock at the alternate location upon completion of the redirected transport by the resource.

19. The system of claim 18, further comprising:
means for updating the stock identifier to associate it with a second bin identifier when the stock has been transported to and stored in the second bin.

20. The system of claim 18, further comprising means for registering the location of the stock with a database.

21. The system of claim 20, wherein the means for registering comprises means for reading at least one of a bar code or a radio frequency identification (RFID) associated with the bin when storing the stock in the bin.

22. The system of claim 20, wherein the means for registering comprises means for reading at least one of a bar code or a radio frequency identification (RFID) associated with the resource when transporting the stock with the resource.

23. The system of claim 20, further comprising means for triggering an update of the stock identifier when the location of the stock with the database is registered.

24. A computer-readable medium comprising instructions for performing a method for managing stock, the method comprising:
issuing a transfer order to move stock from a first bin location to a second bin location, the stock being identified in a database with a stock identifier;
prior to execution of the transfer order, associating the stock identifier with a first bin identifier in the database to identify the stock as being stored in the first bin location, wherein the database is located in a memory device;
updating the database to associate the stock identifier with a resource identifier for a resource causing movement of the stock to the second bin location in accordance with the transfer order, wherein the updating occurs when the resource identifier is scanned during execution of the transfer order, at pickup of the stock by the resource;
identifying the stock as being located with the resource when the stock identifier is associated with the resource identifier;
redirecting the resource, when the location of the stock is identified, to transport the stock to an alternate location, wherein the alternate location includes at least one of a third bin or a pickup and drop location; and
registering the stock at the alternate location upon completion of the redirected transport by the resource.

25. The computer-readable medium of claim 24, the method further comprising:
storing the stock identifier and at least one of the resource identifier and the first or second bin identifiers in a database as a hierarchy.

26. The computer-readable medium of claim 25, the method further comprising registering the location of the stock with a database.

27. The computer-readable medium of claim 26, wherein registering comprises reading at least one of a bar code or a radio frequency identification (RFID) associated with the first or second bin when storing the stock in the first or second bin.

28. The computer-readable medium of claim 27, the method further comprising triggering the further update of the database when the location of the stock in the second bin is registered with the database.

29. The computer-readable medium of claim 26, wherein registering comprises reading at least one of a bar code or a radio frequency identification (RFID) associated with the resource when transporting the stock with the resource.

30. The computer-readable medium of claim 29, the method further comprising triggering the update of the database when the location of the stock with the resource is registered with the database.

31. The computer-readable medium of claim 24, further comprising:

further updating the database to associate the stock identifier with a second bin identifier when the stock has been transported to and stored in the second bin location.

* * * * *